(12) United States Patent
Doddavula

(10) Patent No.: US 8,589,479 B2
(45) Date of Patent: Nov. 19, 2013

(54) DISTRIBUTED REGISTRY FOR DEVICE DISCOVERY USING QUORUM CONSENSUS PROTOCOL

(75) Inventor: Shyam Kumar Doddavula, Bangalore (IN)

(73) Assignee: Infosys Limited, Bangalore (IN)

( * ) Notice: Subject to any disclaimer, the term of this patent is extended or adjusted under 35 U.S.C. 154(b) by 261 days.

(21) Appl. No.: 13/022,439

(22) Filed: Feb. 7, 2011

(65) Prior Publication Data
US 2012/0131090 A1  May 24, 2012

(30) Foreign Application Priority Data

Nov. 22, 2010  (IN) .......................... 3493/CHE/2010

(51) Int. Cl.
*G06F 15/16* (2006.01)
(52) U.S. Cl.
USPC ......................................................... 709/203
(58) Field of Classification Search
USPC ................... 709/203, 217, 227, 242
See application file for complete search history.

(56) References Cited

U.S. PATENT DOCUMENTS

| | | |
|---|---|---|
| 6,615,278 B1 | 9/2003 | Curtis |
| 2005/0283659 A1 | 12/2005 | Lamport et al. |
| 2006/0136781 A1 | 6/2006 | Lamport |
| 2006/0168011 A1 | 7/2006 | Lamport |
| 2007/0156842 A1 * | 7/2007 | Vermeulen et al. ........... 709/217 |
| 2008/0071878 A1 | 3/2008 | Reuter |
| 2009/0150566 A1 * | 6/2009 | Malkhi et al. ................. 709/242 |
| 2010/0017495 A1 | 1/2010 | Lamport |

OTHER PUBLICATIONS

Amir et al., "Paxos for System Builders: An Overview," 2008 Workshop on Large-Scale Distributed Systems and Middleware (LADIS 2008), New York, pp. 1-5 (Sep. 2008).
Attiya et al., "Sharing memory robustly in message-passing systems" Journal of the ACM, 42(1):124-142 (Jan. 1995).
Grimm et al., "Systems directions for pervasive computing," 8th Workshop on Hot Topics in Operating Systems (HotOS-VIII), Elmau/Oberbayern, Germany, pp. 147-151 (May 2001).
Hansmann et al., "Pervasive computing," Second Edition, Springer-Verlag Berlin Heidelberg New York, ISBN 3-540-00218-9, p. 17 (Aug. 2003).
Lamport, "Paxos Made Simple" SIGACT News, vol. 32, No. 4, pp. 51-58 (Dec. 2001).

(Continued)

*Primary Examiner* — Larry Donaghue
*Assistant Examiner* — Marshall McLeod
(74) *Attorney, Agent, or Firm* — Klarquist Sparkman, LLP

(57) ABSTRACT

A distributed hierarchical registry provides services, such as registry services, including client device discovery and communication services. The distributed hierarchical registry comprises a plurality of registry groups where a registry group comprises a plurality of registry servers. The registry servers receive client device information, such as status, capability, and usage information, and update other registry servers, in the same registry group and/or in other registry groups, using a quorum consensus protocol. The registry servers also respond to lookup requests from client devices. Registry servers use policies to define parameters such as a number of registry servers that make up a read quorum and the number of registry servers that make up a write quorum.

15 Claims, 5 Drawing Sheets

(56) References Cited

OTHER PUBLICATIONS

Liu et al., "Combs, needles, haystacks: balancing push and pull for discovery in largescale sensor networks," Proceedings of the 2nd International Conference on Embedded Networked Sensor Systems, ACM, Baltimore, MD, USA, pp. 122-133 (Nov. 3-5, 2004).

Pöhlsen et al., "Robust Web Service Discovery in Large Networks," SCC, vol. 2, IEEE International Conference on Services Computing vol. 2, pp. 521-524 (Jul. 2008).

Saha et al., "Pervasive computing: A paradigm for the $21^{st}$ century," IEEE Computer Society, vol. 36, Issue 3, pp. 25-31 (Mar. 2003).

Satyanarayanan et al., "Pervasive personal computing in an Internet Suspend/Resume System," IEEE Internet computing, vol. 11, No. 2 (Mar./Apr. 2007).

Weiser, "The computer for the $21^{st}$ century," Sci. Amer., 8 pages (Sep. 1991).

Wikipedia, "Digital Living Network Alliance," <http://en.wikipedia.org/w/index.php?oldid=410343508>, 6 pages (accessed Feb. 3, 2011).

Wikipedia, "Paxos Algorithm," <http://en.wikipedia.org/w/index.php?oldid=411470052>, 16 pages (accessed Feb. 3, 2011).

\* cited by examiner

DISTRIBUTED REGISTRY FOR DEVICE DISCOVERY USING QUORUM CONSENSUS PROTOCOL

BACKGROUND

Ubiquitous computing or pervasive computing is a technology vision where computing and communication capabilities and information technology (IT) services are expected to be available wherever consumers are and whenever they need the service. Currently, there are 3.3 billion active mobile devices in the world, equal to half the entire world population. With increasing adoption of technologies like radio-frequency identification (RFID), wireless sensors, and wearable computing, the number of such smart devices is expected to reach one trillion by the year 2012.

This growth of mobile devices is leading to significant changes in the way consumers use technology. Consumers will soon get used to and will be expecting more intelligent products and services like intelligent buildings that save energy, intelligent home appliances that can alert and make decisions, intelligent transportation systems that can make decisions based on real-time traffic information, smart-grids etc. A whole new set of innovative industry specific business cloud products and services based on such pervasive computing will be created over the next generation. In this context enabling automated discovery of intelligent devices and communication between such devices is an important problem to be solved.

In a ubiquitous computing environment where there are several such smart devices, the devices that are used to perform a task will keep changing continuously as the user keeps moving around the environment. Also users will be using and releasing the devices based on their capabilities and availability and depending on the context in which they are performing a task. Also the devices may be powered on and off dynamically and their connectivity may also be on or off depending on several factors like the network availability, device interferences, etc. Enabling automated discovery of the devices by each other as well as collaboration between the devices needs to operate automation under such dynamic conditions and adapt to rapid changes in the environment. The potential number of devices in the environment can also be huge in certain contexts such as those involving RFID, so scalability is also a concern.

Therefore, there exists ample opportunity for improvement in technologies related to device discovery and communication.

SUMMARY

A variety of technologies related to device discovery and communication are applied.

For example, a distributed hierarchical registry is provided for device discovery and communication. The distributed hierarchical registry comprises a plurality of registry groups at a first level of the hierarchical registry, each registry group comprising a plurality of registry servers. The plurality of registry servers in a registry group provide services comprising receiving client update information from client devices, and responding to client lookup requests from client devices. The plurality of registry servers in each of the plurality of registry groups provide the services using, at least in part, a quorum consensus protocol (e.g., a quorum consensus protocol based on Paxos algorithm).

As another example, a method is provided for device discovery and communication using a distributed hierarchical registry. The method comprises Broadcasting a request to identify a registry server, receiving a response from a registry server, and sending client update information to the registry server. The registry server is part of a registry group of the distributed hierarchical registry, and the registry group comprises a plurality of registry servers. The registry server updates other registry servers of the registry group with the client update information using, at least in part, a quorum consensus protocol.

As another example, a computer-readable medium comprising computer executable instructions for causing a client device to perform a method for device discovery and communication is provided, the method comprising broadcasting a request to identify a registry server, receiving a response from a registry server, and sending client update information to the registry server. The registry server is part of a registry group of the distributed hierarchical registry, where the registry group comprises a plurality of registry servers. The registry server updates other registry servers of the registry group with the client update information using, at least in part, a quorum consensus protocol.

The foregoing and other features and advantages of the invention will become more apparent from the following detailed description, which proceeds with reference to the accompanying figures.

DETAILED DESCRIPTION OF EXEMPLARY EMBODIMENTS

Figure 1:
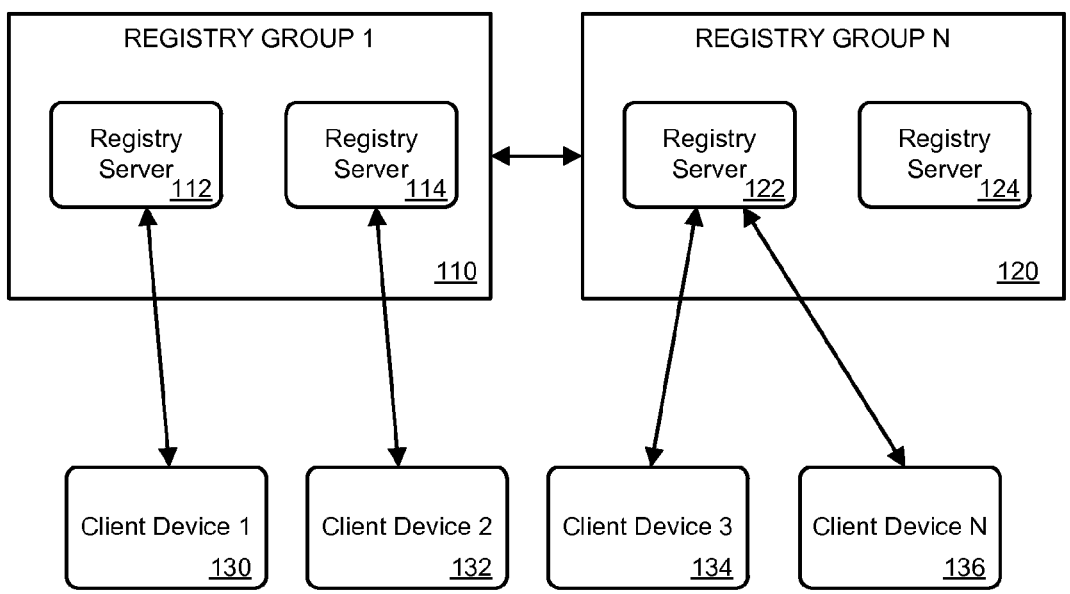
FIG. 1 is a diagram showing an example arrangement of registry servers and registry groups.

The following description is directed to techniques and solutions for providing device discovery and communication using a distributed hierarchical registry. The various techniques and solutions can be used in combination or independently. Different embodiments can implement one or more of the described techniques and solutions.

I. Example Registry Server

In the techniques and solutions described herein, registry servers provide services (e.g., registry services) to client devices (computing devices that utilize the services of the registry servers). In a specific implementation, registry servers are organized into registry groups as part of a distributed hierarchical registry.

Registry servers store information related to client devices. For example, registry servers can store information related to client device capabilities (e.g., network protocols supported by the client device, media services such as streaming audio and/or video supported by the client device), client device status (e.g., whether the client device is currently on or off), and client device usage (e.g., whether the client device is currently playing a media file).

Registry servers receive information from client devices, such as client update information. For example, a registry server can receive information from a client device indicating that the client device has been turned on and is ready to receive streaming audio.

Registry servers respond to client lookup requests from client devices. For example, a registry server can receive a request from a client device to look up another client device. The registry server can look up information about the other client device (e.g., status and network information of the other client device) and send it to the requesting client device. The requesting client device can use the look up information to contact or communicate with the other client device.

A client device is any type of computing device that utilizes the services of the registry servers. Examples of client devices include cell phones, smart phones, desktop computers, laptop computers, tablet computers, netbooks, personal digital assistants, televisions, home entertainment devices, media players, etc.

II. Example Registry Group

In the techniques and solutions described herein, a registry group is a collection of registry servers. The registry servers of the registry store and update information using a quorum consensus protocol to ensure the registry servers of the group maintain the consistency and reliability of the stored registry information.

In a specific implementation, multiple registry groups (each comprising a plurality of registry servers) are organized into a distributed hierarchical registry. The distributed hierarchical registry provides redundant and efficient access to registry servers by client devices. Registry groups within the distributed hierarchical registry communicate information among each other (e.g., provide updated status information for connected client devices and respond to lookup requests).

FIG. 1 is a diagram showing an example arrangement 100 of registry servers (112, 114, 122, and 124) and registry groups (110 and 120). In the diagram 100 registry groups, such as registry group 1 (110) and registry group N (120) provide registry services to client devices (e.g., client devices 1-N, 130-136).

Within each registry group (e.g., 110 and 120) a quorum consensus protocol is used to maintain consistent registry information. A quorum consensus protocol can also be used between registry groups (e.g., between group 110 and 120).

In a specific implementation, the Paxos algorithm is used to provide the quorum consensus protocol. A description of the Paxos algorithm can be found in the paper "Paxos Made Simple" by Leslie Lamport, SIGACT News, Vol. 32, No. 4. (December 2001), pp. 51-58.

In another specific implementation, the quorum consensus algorithm described in the paper "Sharing memory robustly in message-passing systems" by Attiya et al., Journal of the ACM, 42(1):124-142, January 1995, is used.

III. Example Distributed Hierarchical Registry

In the techniques and solutions described herein, a distributed hierarchical registry is used to provide device discovery and communication services to client devices. The distributed hierarchical registry is composed of two or more levels, with each level comprising one or more registry groups, and each registry group comprising a plurality of registry servers. For example, a distributed hierarchical registry can provide registry services for a business or organization, or for a location such as a city, campus, or residence.

Figure 4:
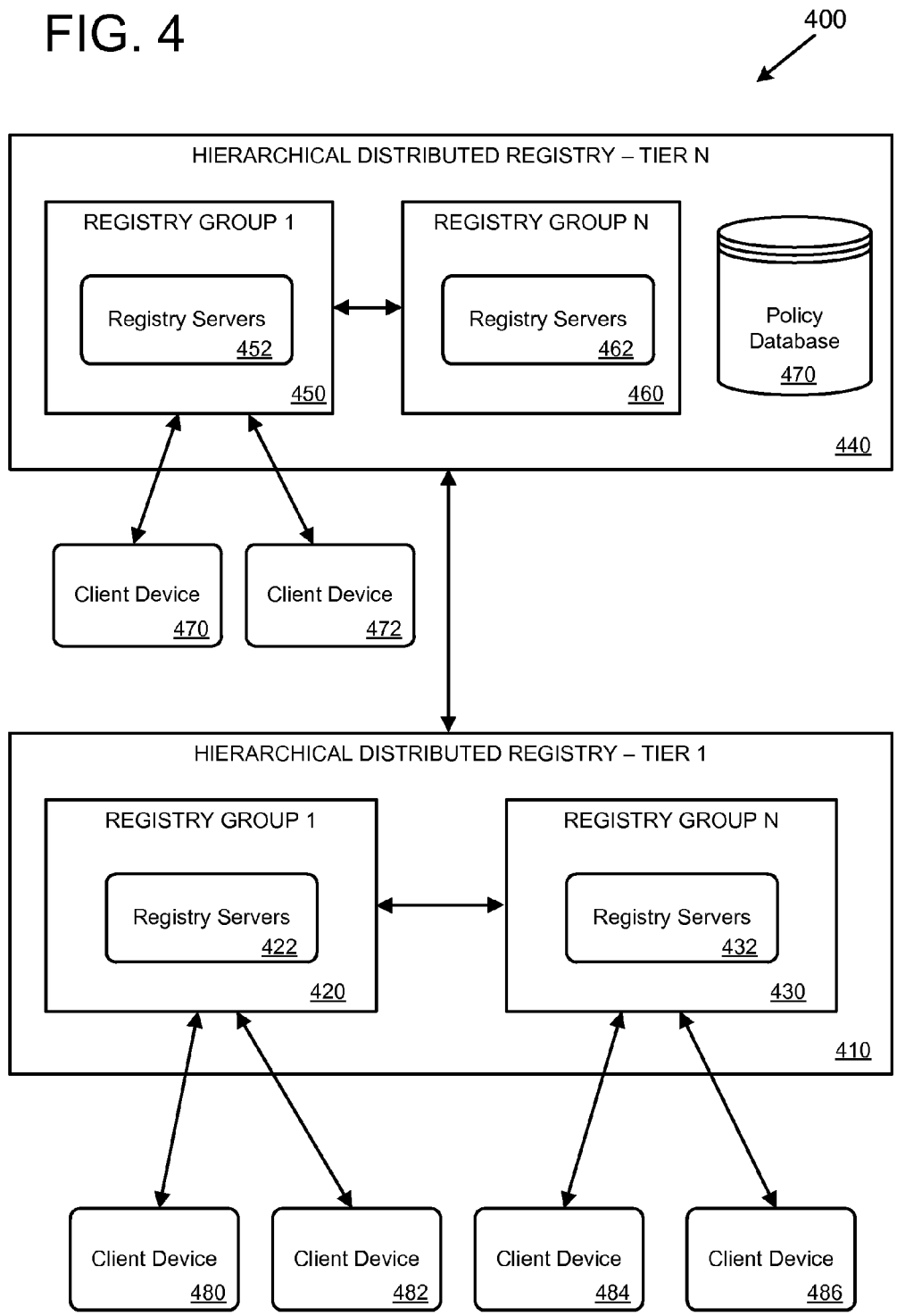
FIG. 4 is a diagram showing an example hierarchical distributed registry.

FIG. 4 is a diagram showing an example hierarchical distributed registry 400 for providing device discovery and communication services. The distributed registry 400 can comprise any number of levels or tiers. In the example distributed registry 400, two tiers are depicted, tier 1 (410) and tier N (440).

Each tier or level of the distributed registry comprises one or more registry groups. For example, tier 1 of the hierarchical distributed registry 410 includes registry group 1 (420) and registry group N (430). The registry groups at each level communicate with registry groups at other levels to exchange information, such as client update information, and to provide lookup services.

Each registry group (e.g., registry groups 420, 430, 450, and 460) comprises registry servers (e.g., 422, 432, 452, and 462). The registry servers store registry information, respond to client device updates, and provide responses to client device lookup requests.

Client devices can access registry servers at any level of the hierarchy. For example, client devices 480-486 are in communication with registry servers of the tier 1 (410), while client devices 470 and 472 are in communication with registry servers of tier N (440).

The distributed registry 400 also includes a policy database 470. The policy database 470 stores policy information, such as information defining a number of registry servers required to form a write quorum and a read quorum. The policy database 470 can also store other information, such as how communication is handled between registry groups and between tiers of the hierarchy.

The policy database 470 is depicted as a component of tier N (440) of the distributed registry. However, the policy database 470 can be located at other levels of the hierarchy, outside the hierarchy, or it can be distributed at different locations (e.g., stored at one or more registry servers) of the distributed registry.

IV. Example Methods for Device Discovery and Communication

Figure 2:
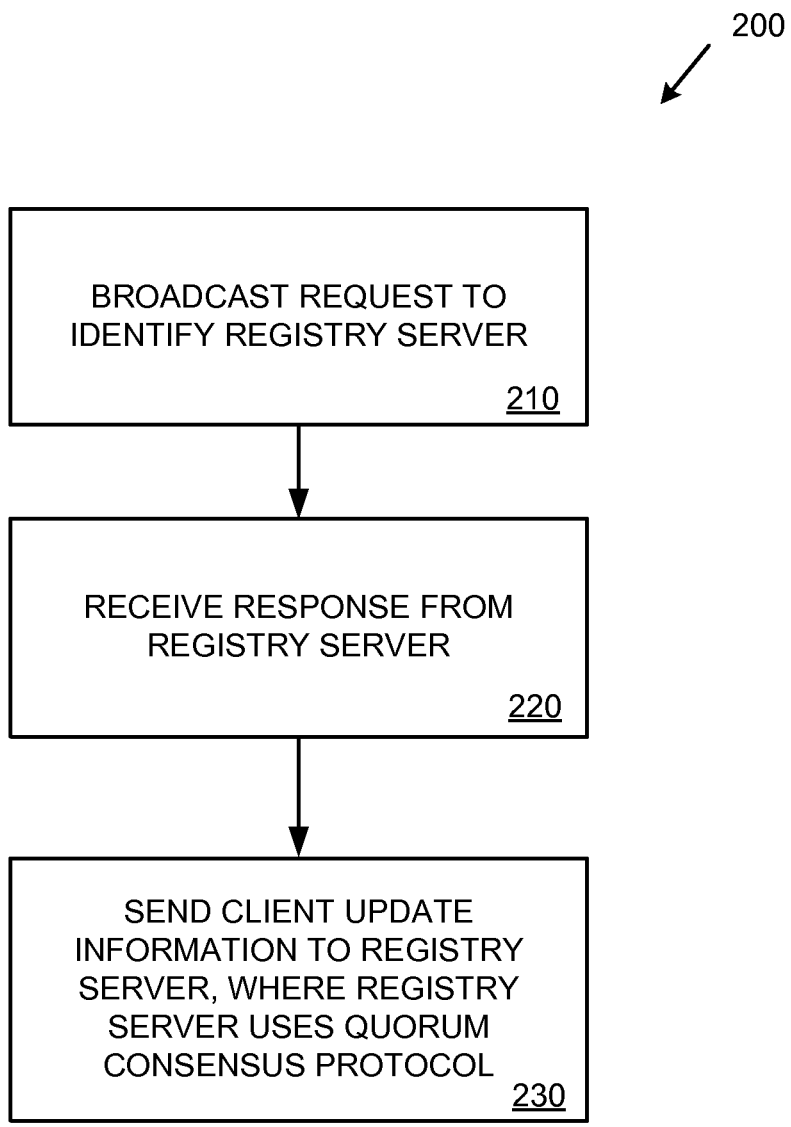
FIG. 2 is a flowchart showing an exemplary method for updating client information.

FIG. 2 shows an example method 200 for updating client information using a distributed hierarchical registry. At 210, a request is broadcast by a client device to identify a registry server. At 220, a response is received by the client device from a registry server. At 230, the client device sends updated client information to the registry server. For example, the client device can send client update information 230 regarding the current status of the client (e.g., that the client is now on and ready to communicate with other client devices) and the capabilities of the client.

The client update information from the client device 230 is received by the registry server, which updates other registry servers in the registry group using a quorum consensus protocol. In addition, the registry server can update other registry groups (e.g., at the same level of the hierarchy or at different levels) with the client update information.

Figure 3:
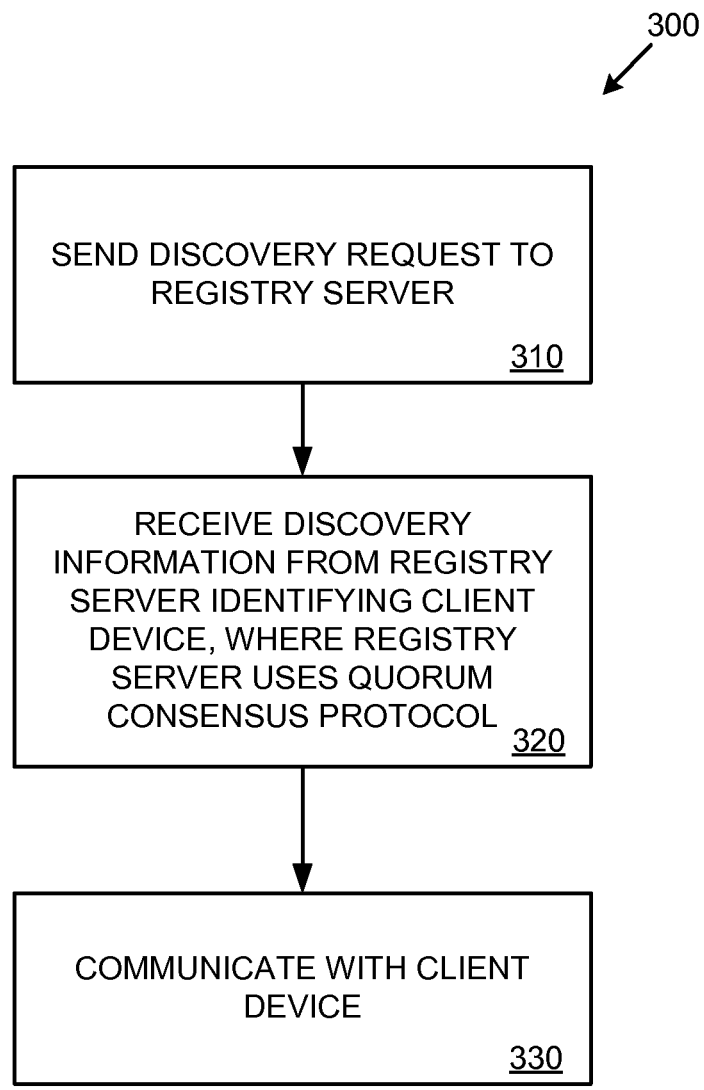
FIG. 3 is a flowchart showing an example method for device discovery.

FIG. 3 shows an example method 300 for updating client information using a distributed hierarchical registry. At 310, a discovery request is sent to a registry server from a client device. The discovery request includes information used to discover other client devices. For example, the discovery request information can include a requested capability, such as the capability to play audio or video.

At 320, discovery information is received by the client device from the registry server. The discovery information can identify one or more client devices that have been identified by the registry server based on the discovery request 310. The registry server uses a quorum consensus protocol to retrieve the discovery information.

At 330, the client device communicates with the discovered client device. For example, the client device could send a discovery request 310 for another device capable of streaming audio. In response, the client device could receive discovery information 320 identifying a home entertainment device capable of streaming audio. The client device could then communicate 330 with the home entertainment device (e.g., start streaming audio to the home entertainment device).

V. Example Implementation of a Distributed Hierarchical Registry for Device Discovery and Communication In a specific implementation, a distributed hierarchical registry is used with quorums to enable device discovery and communication. Client devices are configured to work with a group and can interact with any server in the pool of that group. This provides high scalability and high performance as there are multiple registry servers which can share the load across each other. The client devices are associated with the registry servers by using a multicast or broadcast mechanism, or they are pre-configured with the registry server information. The client devices update their status information and get the status information of other devices using the registry servers.

Registry servers can support operations including:
- Updating their context information, such as the capabilities they support, their availability, their current status in terms of usage, etc.
- Looking up other client devices based on desired characteristics or based on identifiers, etc.
- Looking up the status of other client devices.
- Looking up information about other registry servers or registry groups.

Registry servers support multiple transport protocols and mechanisms, such as wireless communications (e.g., Wi-Fi and Bluetooth) and wired communications.

The registry servers form a hierarchy with multiple tiers and with multiple groups in each tier. At each tier there are multiple groups of registry servers and each group consists of a pool of registry servers who have the information replicated across all servers in the group. For example, a hierarchical tree name space mechanism can be used to create the registry pools. An example name in a name space for a corporation could be "corporation.department.city.building.floor" to create a grouping of devices with registries at each level. A pool of registry servers form a quorum at each level and provide a fault tolerant registry lookup service.

Registry servers form the quorum groups and coordinate with other registry servers based on policies. Policies can include a policy governing the formation of the registry server quorum groups, a policy governing the kind of information the registry servers hold, and a policy governing the roles that the registry servers play. When a registry server is started, it checks the policies and obtains the information about the other registry servers (e.g., in its registry server group or in other registry server groups). Registry servers participate in the appropriate quorums based on the policies defined.

When a client device needs to lookup another client device, it first finds a registry server and uses the registry server's services. For example, the client device can broadcast a request asking registry servers available nearby to respond. Registry servers respond with details about themselves, such as their location, the services they provide, etc. The client device then selects one of the registry servers to communicate with.

The device and the registry server it is associated with can exchange heart-beat messages periodically. For example, if the client device fails to respond to a heart-beat request, its status is updated accordingly at the registry server (e.g., listed as off-line). If the registry server does not respond to a heart-beat message from the client device, the client device can look up (e.g., broadcast for) a different registry server.

The client device communicates its information (e.g., client update information) to a quorum of registry servers of the namespace it is associated with. For example, the client device performs some or all of the following operations:

- The client device first sends its information to the registry server it is associated with.
- The registry server in turn uses a quorum consensus protocol to update the status to a write quorum of the namespace registry group it is associated with.
- The registry server receiving the client device information may also participate in the appropriate quorums.
- The client device itself may also communicate with the quorums directly based on its capabilities.

The client device communicates look up requests for other devices it wants to communicate with using the registry server that the client device is associated with. The registry server in turn looks up other client devices in the various groups traversing the hierarchical tree (e.g., based on policies). For example, the registry server performs some or all of the following operations:

- The registry server receives a look up request with lookup criteria from a client device associated with the registry server.
- The registry server in turn uses a quorum consensus protocol to look up client devices that meet the criteria using a read quorum of registry servers of the registry group of the namespace group it is associated with.
- The registry server, or another designated registry server in the read quorum of the current namespace group, may communicate with other quorums in other registry groups (e.g., in the same level or tier of the namespace or in other levels or tiers of the namespace) to find the appropriate client devices based on the traversal policies defined in the policy database.

There are several quorum consensus protocols that can be used to implement the techniques and solutions described herein. One quorum consensus protocol is Paxos which is a family of protocols for solving consensus in a network of unreliable servers. Paxos helps solve problems, such as failure scenarios at server level, servers may operate at different speeds, and servers may re-join after failures. It also helps address network level failures like messages which may get lost, duplicated, reordered or may take different times to traverse the network. The registry servers that make up the registry service must all know about each other. They maintain an in-memory image of state, along with transaction logs and snapshots in a persistent store. As long as a majority of the registry servers are available, the registry service will be available. Since a group of registry servers are used with any registry server being capable of serving requests, the performance and availability is higher than alternative solutions.

In a specific implementation, the servers store the information within a hierarchical namespace. The data stored at each node in a namespace is read and written atomically. The nodes support the concept of ephemeral existence so client information will remain active only as long as the session is active (e.g., based on a timeout). This helps maintain the transitional information about the client devices. The registry servers also support the concept of monitoring so that anyone interested in changes to a client device can be notified when there are changes.

VI. Example Computing Device

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video steaming capabilities and/or network access capabilities). The techniques and solutions described herein can be performed in a cloud computing environment (e.g., comprising virtual machines and underlying infrastructure resources).

Figure 5:
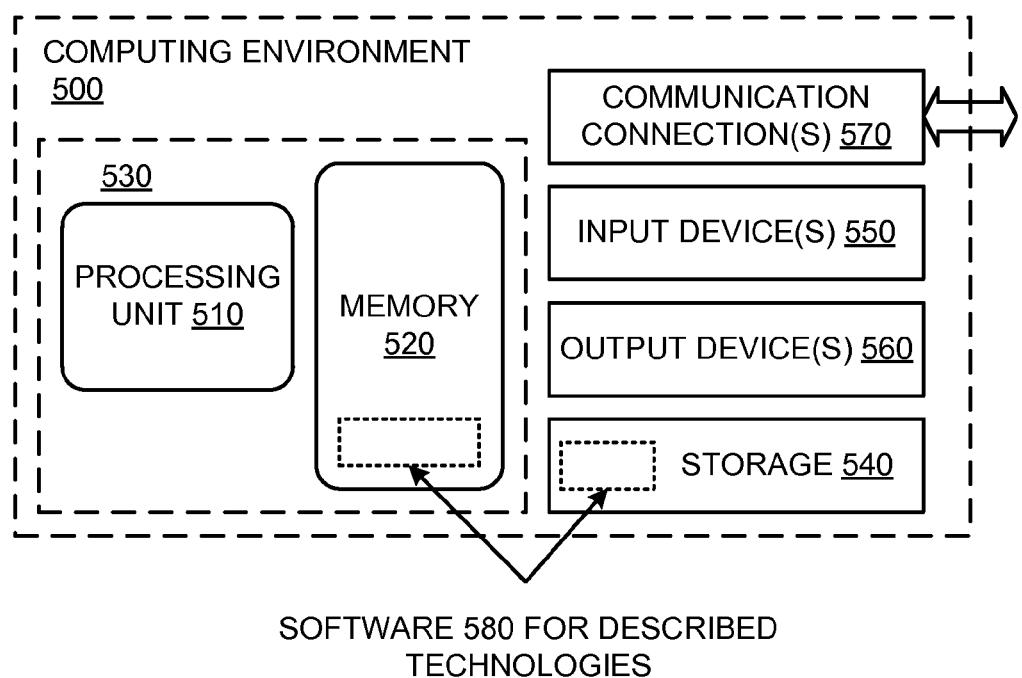
FIG. 5 is a block diagram showing an example computing device.

FIG. 5 illustrates a generalized example of a suitable computing environment 500 in which described embodiments, techniques, and technologies may be implemented. The computing environment 500 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 5, the computing environment 500 includes at least one central processing unit 510 and memory 520. In FIG. 5, this most basic configuration 530 is included within a dashed line. The central processing unit 510 executes computer-executable instructions and may be a real or a virtual processor. In a multi-processing system, multiple processing units execute computer-executable instructions to increase processing power and as such, multiple processors can be running simultaneously. The memory 520 may be volatile memory (e.g., registers, cache, RAM), non-volatile memory (e.g., ROM, EEPROM, flash memory, etc.), or some combination of the two. The memory 520 stores software 580 that can, for example, implement the technologies described herein. A computing environment may have additional features. For example, the computing environment 500 includes storage 540, one or more input devices 550, one or more output devices 560, and one or more communication connections 570. An interconnection mechanism (not shown) such as a bus, a controller, or a network, interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other tangible storage medium which can be used to store information and which can be accessed within the computing environment 500. The storage 540 stores instructions for the software 580, which can implement technologies described herein.

The input device(s) 550 may be a touch input device, such as a keyboard, keypad, mouse, pen, or trackball, a voice input device, a scanning device, or another device, that provides input to the computing environment 500. For audio, the input device(s) 550 may be a sound card or similar device that accepts audio input in analog or digital form, or a CD-ROM reader that provides audio samples to the computing environment 500. The output device(s) 560 may be a display, printer, speaker, CD-writer, or another device that provides output from the computing environment 500.

The communication connection(s) 570 enable communication over a communication medium (e.g., a connecting network) to another computing entity. The communication medium conveys information such as computer-executable instructions, compressed graphics information, or other data in a modulated data signal.

VII. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 520 and/or storage 540. As should be readily understood, the term computer-readable media does not include communication connections (e.g., 570) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. I therefore claim as my invention all that comes within the scope and spirit of these claims.

I claim:

1. A distributed hierarchical registry for device discovery and communication, the distributed hierarchical registry comprising:
    a plurality of registry groups at a first level of the hierarchical registry, each registry group comprising a plurality of registry servers, wherein the plurality of registry servers in a registry group provide services comprising:
        receiving client update information from client devices; and
        responding to client lookup requests from client devices;
    wherein the plurality of registry servers in each of the plurality of registry groups provide the services using, at least in part, a quorum consensus protocol;
    wherein the quorum consensus protocol defines a number of registry servers that make up a read quorum and a number of registry servers that make up a write quorum; and
    wherein the sum of the number of registry servers that make up the read quorum and the number of registry servers that make up the write quorum is greater than the number of registry servers in the registry group.

2. The distributed hierarchical registry of claim 1 wherein the client update information comprises:
    client device capabilities;
    client device status; and
    client device usage.

3. The distributed hierarchical registry of claim 1 further comprising:
    a policy database, wherein the policy database comprises policies comprising:
    a policy defining a write quorum; and
    a policy defining a read quorum.

4. The distributed hierarchical registry of claim 1 wherein registry servers within a registry group update other registry servers in the same registry group using Paxos algorithm.

5. The distributed hierarchical registry of claim 1 wherein registry groups communicate with other registry groups to provide client update information and respond to client lookup requests.

6. The distributed hierarchical registry of claim 1 wherein the quorum consensus protocol uses the Paxos algorithm.

7. The distributed hierarchical registry of claim 1 further comprising:
    a plurality of registry groups at a second level of the hierarchical registry, each registry group at the second level comprising a plurality of registry servers.

8. A method, implemented at least in part by a client device, for device discovery and communication using a distributed hierarchical registry, the method comprising:
    broadcasting, by the client device, a request to identify a registry server;
    receiving, by the client device, a response from a registry server; and
    sending, by the client device, client update information to the registry server, wherein the registry server is part of a registry group of the distributed hierarchical registry, wherein the registry group comprises a plurality of registry servers, and wherein the registry server updates other registry servers of the registry group with the client update information using, at least in part, a quorum consensus protocol;
    wherein the quorum consensus protocol defines a number of registry servers that make up a read quorum and a number of registry servers that make up a write quorum; and
    wherein the sum of the number of registry servers that make up the read quorum and the number of registry servers that make up the write quorum is greater than the number of registry servers in the registry group.

9. The method of claim 8 further comprising:
    sending, by the client device to the registry server, a discovery request to discover one or more other client devices, wherein the registry server responds to the client device with discovery information, obtained from the distributed hierarchical registry, related to the one or more other client devices.

10. The method of claim 8 wherein the registry server sends write requests to a write quorum of registry servers from the registry group, and wherein the registry server sends read requests to a read quorum of registry servers from the registry group.

11. The method of claim 8 wherein the quorum consensus protocol uses the Paxos algorithm.

12. A non-transitory computer-readable medium storing computer executable instructions for causing a client device to perform a method for device discovery and communication using a distributed hierarchical registry, the method comprising:
    broadcasting a request to identify a registry server;
    receiving a response from a registry server; and
    sending client update information to the registry server, wherein the registry server is part of a registry group of the distributed hierarchical registry, wherein the registry group comprises a plurality of registry servers, and wherein the registry server updates other registry servers of the registry group with the client update information using, at least in part, a quorum consensus protocol;
    wherein the quorum consensus protocol defines a number of registry servers that make up a read quorum and a number of registry servers that make up a write quorum; and
    wherein the sum of the number of registry servers that make up the read quorum and the number of registry servers that make up the write quorum is greater than the number of registry servers in the registry group.

13. The non-transitory computer-readable medium of claim 12, the method further comprising:
    sending a discovery request to discover one or more other client devices, wherein the registry server responds to the client device with discovery information, obtained from the distributed hierarchical registry, related to the one or more other client devices.

14. The non-transitory computer-readable medium of claim 12 wherein the registry server sends write requests to a write quorum of registry servers from the registry group, and wherein the registry server sends read requests to a read quorum of registry servers from the registry group.

15. The non-transitory computer-readable medium of claim 12 wherein the quorum consensus protocol uses the Paxos algorithm.

* * * * *